UNITED STATES PATENT OFFICE.

WILLIAM FREDERICK NAST, OF ST. LOUIS, MISSOURI.

OBTAINING AMMONIA FROM MANURE, &c.

SPECIFICATION forming part of Letters Patent No. 374,618, dated December 13, 1887.

Application filed May 4, 1887. Serial No. 237,065. (No specimens.) Patented in France September 17, 1886, No. 178,595; in Germany October 1, 1886, No. 40,980; in England December 4, 1886, No. 15,887, and in Belgium March 7, 1887, No. 76,604.

*To all whom it may concern:*

Be it known that I, WILLIAM FREDERICK NAST, a citizen of the United States, and a resident of St. Louis, in the State of Missouri, at present temporarily in London, England, have invented certain new and useful improvements in processes of treating manure and other organic matters in the production of ammonia, and residual products free from the same, of which the following is a specification.

My invention relates to an improvement in processes for producing ammonia from manure and other organic matters; and it consists in certain improvements upon the process now in use for the extraction of ammonia by treatment of the manure and other organic matters containing nitrogen at high temperatures in closed vessels, for which I have received foreign patents as follows: Great Britain, No. 15,887, December 4, 1886; Germany, No. 40,980, October 1, 1886; France, No. 178,595, September 17, 1886, and Belgium, No. 76,604, March 7, 1887.

The object of my invention is, first, the extraction of the ammonia, and, secondly, the production of residual products practically free from ammonia, which are of great value for the manufacture of various articles where fibrous materials in the form of pulp may be advantageously used.

In the process heretofore patented by me for the extraction of ammoniacal salts the manure or other material to be treated was treated by means of steam, and the vapors and gases were passed through a tank containing an alkaline solution, whence they were conducted into an ordinary condenser and there saved. In order to obtain or produce ammonia from manure or other organic matter, it is sufficient to bring it in contact with an alkaline base, such as lime, potash, and soda, or the like, or any compound containing those bases, and to heat at a temperature of about 158° to 194° Fahrenheit. If the operation be performed in a closed vessel—such as a boiler—and the released vapor of ammonia be made to pass through water acidulated with sulphuric acid, the ammonia will combine with the acid in the acidulated bath and form sulphate of ammonia.

If, in operating by this process, it is desired to recover the fixed nitrogen in the form of ammonia, or at least a part of the same, it is necessary to repeat the operation several times, to renew from time to time the lime which has become spent after each operation, and to heat the material treated to a temperature varying from 284° to 302° Fahrenheit; and it is even then most difficult to effect the extraction of the fixed nitrogen as ammonia. Each time that an organic substance containing nitrogen is submitted to the action of some substance capable of completely changing its molecules—as, for example, the action of the hydrated oxides of the alkalies—the nascent hydrogen and hydrogen unite in the form of nitrogen and hydrogen unite in the form of ordinary ammonia ($NH_3$) or other ammonias of extremely complex and variable composition. These latter are undoubtedly transformed by the alkaline oxide into derivatives of ammonio-metallic bases of the form of nitrides of lime and hydrogen of varying composition, which in their turn are decomposed by the process of digesting, but with considerable slowness. Now I have discovered that when this operation, above described, is conducted in the presence of a body susceptible of facilitating this decomposition—as, for example, choloride of sodium or other chloride—the decomposition aforesaid will take place exceedingly rapidly. In fact the nascent oxygen arising from the decomposition of the lime, when these nitrides of lime and hydrogen are formed, acts upon the chloride of sodium and forms hydrochloric acid, or free chlorine, which unites with the nitrides of lime, forming a body of the form of a chloride of ammonia and lime. This body is decomposed into two chlorides, one of ammonia and the other of lime, it being the excess of lime in the mixture which decomposes the nascent chloride of ammonia and frees the ammonia. Thus I am able to obtain, in the form of ammonia, all the fixed nitrogen contained in manure or other organic matter by adding thereto common salt, or chloride of sodium, or other equivalent chloride, in the proportion of about two per cent., by weight, to the lime or other base, and performing the operation in a boiler or other closed vessel of similar character at temperatures the same as those hereinbefore mentioned.

In practice, when stable-manure is heated in a closed boiler with five per cent. of lime and two per cent of chloride of sodium at a working-pressure of about five atmospheres, corresponding to a temperature of about 302° Fahrenheit, all the fixed nitrogen is extracted in the operation in the form of ammonia, which upon being passed through a bath of a solution of sulphuric acid will unite with the acid to form sulphate of ammonia.

It is obvious from the foregoing that by employing other acids other salts of ammonia may be produced. Thus, for example, by employing nitric acid nitrate of ammonia is produced. By means of the addition of the chloride of sodium, or other similar chlorides, or, in fact, of any other equivalent agent which produces the same effect in the presence of heat, I am able to extract practically all of the nitrogen from the manure, &c., and to leave a residual product, practically free from ammonia, which is of great value.

I claim as my invention—

1. The hereinbefore-described process of extracting ammonia from manure or other organic matters, consisting in adding to the matter to be treated an alkaline base, and in treating the same with chloride of sodium or other equivalent chloride in a closed vessel at a high temperature, and in passing the vapors through a bath or solution of acid, whereby a salt of ammonia is formed and a residual product is left substantially free from ammonia.

2. The hereinbefore-described process of extracting ammonia from manure or other organic matter, consisting in adding thereto an alkaline base, such as milk of lime, &c., and in treating the same with chloride of sodium or other equivalent chloride, with the addition of heat.

Signed at the city of London, in the county of Middlesex, and Kingdom of Great Britain, this 20th day of April, A. D. 1887.

WILLIAM FREDERICK NAST.

Witnesses:
THOMAS M. WALLER,
H. H. NEWMAN.